United States Patent
Yandrick et al.

(10) Patent No.: US 7,251,899 B2
(45) Date of Patent: Aug. 7, 2007

(54) PRISM POLE

(75) Inventors: Richard Yandrick, Sellersville, PA (US); Edward Wilkinson, Spring City, PA (US); John Wilkinson, Phoenixville, PA (US)

(73) Assignee: Wilkinson & Associates, Inc., Valley Forge, PA (US)

( * ) Notice: Subject to any disclaimer, the term of this patent is extended or adjusted under 35 U.S.C. 154(b) by 3 days.

(21) Appl. No.: 11/335,187

(22) Filed: Jan. 18, 2006

(65) Prior Publication Data

US 2006/0201008 A1    Sep. 14, 2006

Related U.S. Application Data

(60) Provisional application No. 60/644,709, filed on Jan. 18, 2005.

(51) Int. Cl.
*G01C 15/06* (2006.01)

(52) U.S. Cl. .................................................. 33/294

(58) Field of Classification Search ................. 33/294, 33/293, 295, 296, 809–812, 706, 707
See application file for complete search history.

(56) References Cited

U.S. PATENT DOCUMENTS

| | | | | |
|---|---|---|---|---|
| 4,029,415 A | * | 6/1977 | Johnson | 356/4.08 |
| 4,653,910 A | * | 3/1987 | Poling | 356/141.3 |
| 4,993,160 A | * | 2/1991 | Fraley | 33/286 |
| 5,070,620 A | * | 12/1991 | Crain et al. | 33/296 |
| 5,457,890 A | * | 10/1995 | Mooty | 33/294 |
| 5,551,159 A | * | 9/1996 | Mooty | 33/228 |
| 5,894,344 A | * | 4/1999 | Tamez et al. | 356/4.08 |
| 5,915,810 A | * | 6/1999 | Cameron | 33/809 |
| 5,957,717 A | * | 9/1999 | Monsef et al. | 439/339 |
| 5,983,511 A | * | 11/1999 | Osaragi et al. | 33/293 |
| 6,076,267 A | * | 6/2000 | Gotoh | 33/293 |
| 6,085,434 A | * | 7/2000 | Mitchell | 33/809 |
| 6,166,802 A | * | 12/2000 | Kodaira et al. | 356/4.08 |
| 6,209,210 B1 | * | 4/2001 | Stout | 33/293 |
| 6,508,006 B1 | * | 1/2003 | Black | 33/293 |
| 6,662,458 B1 | * | 12/2003 | Antonelli | 33/293 |

* cited by examiner

*Primary Examiner*—Christopher W. Fulton
(74) *Attorney, Agent, or Firm*—Charles N. Quinn

(57) ABSTRACT

A direct reading prism pole has a tubular housing having an open top, a flange at the open top, a conical bottom portion for wedging the tubular housing into ground soil, a height-adjusting rod partially inserted into the tubular housing by a friction fit, a lip positioned at the top of height-adjustable rod, a laser sensor mounted to the outer surface of the tubular housing for emitting a laser toward the lip to take height measurements of the distance between the laser sensor and the lip, an electronic control unit for receiving the height measurements and providing height reference data, an electronic display for displaying the height reference data, an audio device for emitting an alarm indicating movement of the height-adjusting rod with respect to the tubular housing, and an output device for sending the height reference data to a data collection device.

3 Claims, 4 Drawing Sheets

PRISM POLE

CROSS-REFERENCE TO RELATED PATENT APPLICATION

This patent application claims the benefit under 35 USC 119 of U.S. provisional patent application Ser. No. 60/644,709 entitled "Direct Reading Prism Pole", filed 18 Jan. 2005 in the names of Richard Yandrick, Edward Wilkinson and John Wilkinson.

BACKGROUND OF THE INVENTION

1. Field of Invention

The invention relates to a prism pole for supporting a reflective prism or other piece of equipment for surveying landforms, structures, etc, which facilitates automatically taking height measurements and providing height reference data corresponding therewith.

2. Description of Related Art

Prism poles as used in surveying to support a reflective prism or other piece of surveying equipment. Prior art prism poles, of the prior art, such as shown in FIG. 1, include a tubular housing and a height-adjustable rod partially inserted therein. The height-adjustable rod slides inwardly and outwardly with respect to the tubular housing. Prior art prism poles include a numerical scale printed on the height-adjustable rod, typically marked in increments of hundredths ($\frac{1}{100}$) of a foot or thousandths ($\frac{1}{1000}$) of a meter. A reflective prism or other piece of surveying equipment attaches to the top of the height-adjustable rod. A prism pole operator can manually read a height measurement from the numerical scale at a point along the height-adjustable rod. The operator typically then records the height measurement into a log book or manually enters the height measurement into a data collection device.

Prior art prism poles allow human error to interfere with accurate measurement-taking. For example, the height-adjustable rod of the prism pole may slowly slip down into the tubular housing, unbeknownst to the prism pole operator. Because the operator is unaware of minor slippage, the operator errs in recording accurate height measurements. Prior art prism poles are also problematic because operators often misread height measurements from the numerical scale. In addition, operators often fail to record changes in height measurements when the operator adjusts the position of the height-adjustable rod. Operators also make transposition errors when manually copying height measurements from the numerical scale into a log book or data collection device. A prism pole is needed that reduces the amount of human error that interferes with accurate measurement-taking.

SUMMARY OF THE INVENTION

The invention includes a direct reading prism pole having a height-adjustable rod and an encoded strip of optically-perceptible markings positioned longitudinally on the height-adjustable rod. The direct reading prism pole may include a tubular housing. The height-adjustable rod is partially inserted into the tubular housing and has an outer diameter just less than the inner diameter of the tubular housing to create a friction fit therebetween. The height-adjustable rod slides inwardly and outwardly with respect to the tubular housing, but is also able to remain static due to the friction fit. The direct reading prism pole includes a lip at the top of the height-adjustable rod.

The direct reading prism pole preferably also include an electronic control unit with an optical reader for taking height measurements from the encoded strip and providing height reference data corresponding to the height measurements. As used herein, "height reference data" includes (1) data representative of one or more instantaneous height measurements ($h_n$), (2) data representative of one or more changes between height measurements ($\Delta h_{n,n+1}$), and/or (3) other related data.

The direct reading prism pole may also include an electronic display in electrical communication with the electronic control unit. The electronic display receives the height reference data from the electronic control unit and displays the height reference data on a screen. The direct reading prism pole may also include an audio device, such as a speaker, in electrical communication with the electronic control unit. The audio device desirably emits an alarm in response to receipt of a signal from the electronic control unit, indicating the height-adjustable rod has moved with respect to the tubular housing. The direct reading prism pole desirably also includes an output device, such as a wireless transmitter or an output jack, in electrical communication with the electronic control unit. The output device preferably sends height reference data from the electronic controller unit to a data collection device, such as an electronic field device or a remote computer system.

In another embodiment of the invention, the direct reading prism pole includes an electronic control unit having a wheel assembly. The wheel assembly includes a wheel rotatable about a central axis, and the perimeter of the wheel forms a friction fit with the height-adjustable rod. The friction fit causes the wheel to rotate about the central axis when the height-adjustable rod moves with respect to the tubular housing. The electronic control unit preferably calculates a height measurement using the previous (or default) height measurement and a change in height calculated from the angular displacement of the wheel.

In yet another embodiment of the invention, the direct reading prism pole includes a laser sensor in combination with an electronic control unit. The laser sensor preferably mounts on the outer surface of the tubular housing and emits a laser toward the lip at the top of the height-adjustable rod. The electronic control unit calculates a height measurement using the distance measured between the laser sensor and the lip and a default distance corresponding to a fully extended position of the height-adjustable rod.

DESCRIPTION OF THE DRAWINGS

The accompanying drawings, which are incorporated in and form a part of the specification, illustrate the invention and, together with the description, set forth the best mode for practice of the invention as currently contemplated.

DETAILED DESCRIPTION OF THE INVENTION

Figure 1:
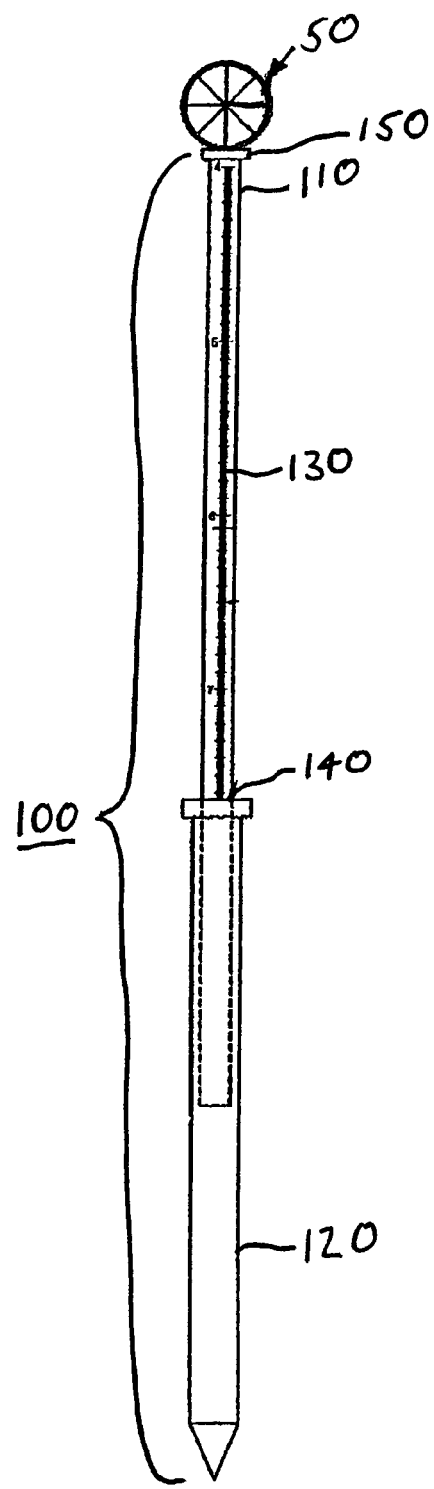
FIG. 1 is a front elevation of a reflective prism and a prism pole of the prior art.

Referring to FIG. 1, a prior art prism pole is shown and designated generally 100 with a reflective prism being shown and designated generally 50. Prism pole 100 includes a height-adjustable rod 110 telescopically resident within a tubular housing 120 and a numerical scale 130 imprinted on height-adjustable rod 110. Height-adjustable rod 110 is partially inserted inside tubular housing 120 with a friction fit therebetween. Numerical scale 130 is preferably printed on height-adjustable rod 110 and is preferably positioned longitudinally along height-adjustable rod 110. Tubular housing 120 has an open top for passage of height-adjustable rod 110 thereinto and a conical bottom portion for wedging tubular housing 120 into ground soil and the like. Tubular housing 120 has a flange at the open top to delineate a reading point 140 where an operator of prism pole 100 can manually read a height measurement from numerical scale 130. The distance between reading point 140 and the top of height-adjustable rod 110 is preferably about seven (7) feet when height-adjustable rod 110 is fully extended with respect to tubular housing 120. The top of height-adjustable rod 110 preferably includes a lip 150. Reflective prism 50 preferably attaches to prism pole 100 at lip 150.

Figure 2A:
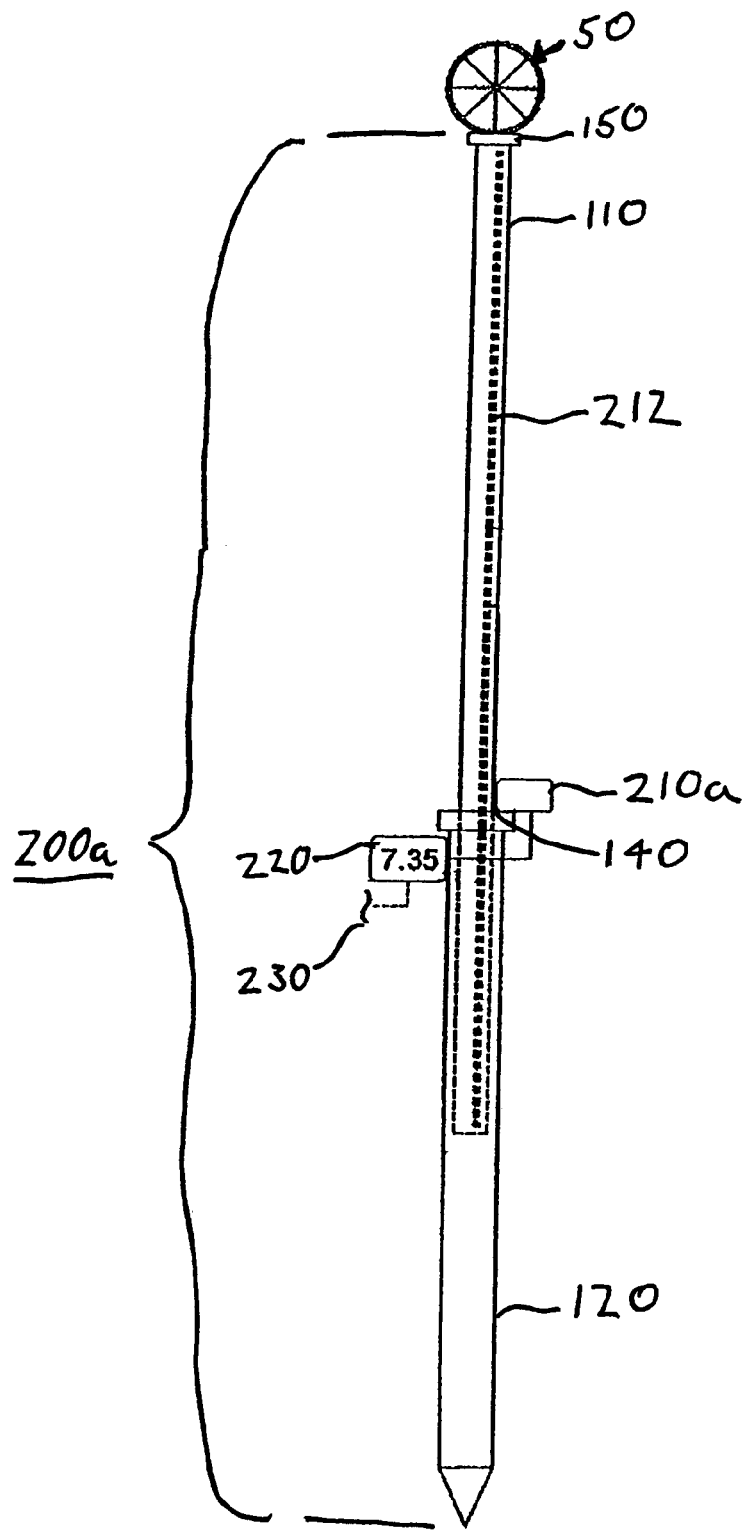
FIG. 2a is a front elevation in accordance with the invention of a reflective prism and a direct reading prism pole having an encoded strip and an electronic control unit with an optical reader. The portion of the encoded strip and height-adjustable rod depicted inside the tubular housing are shown with dotted lines.
Figure 2B:
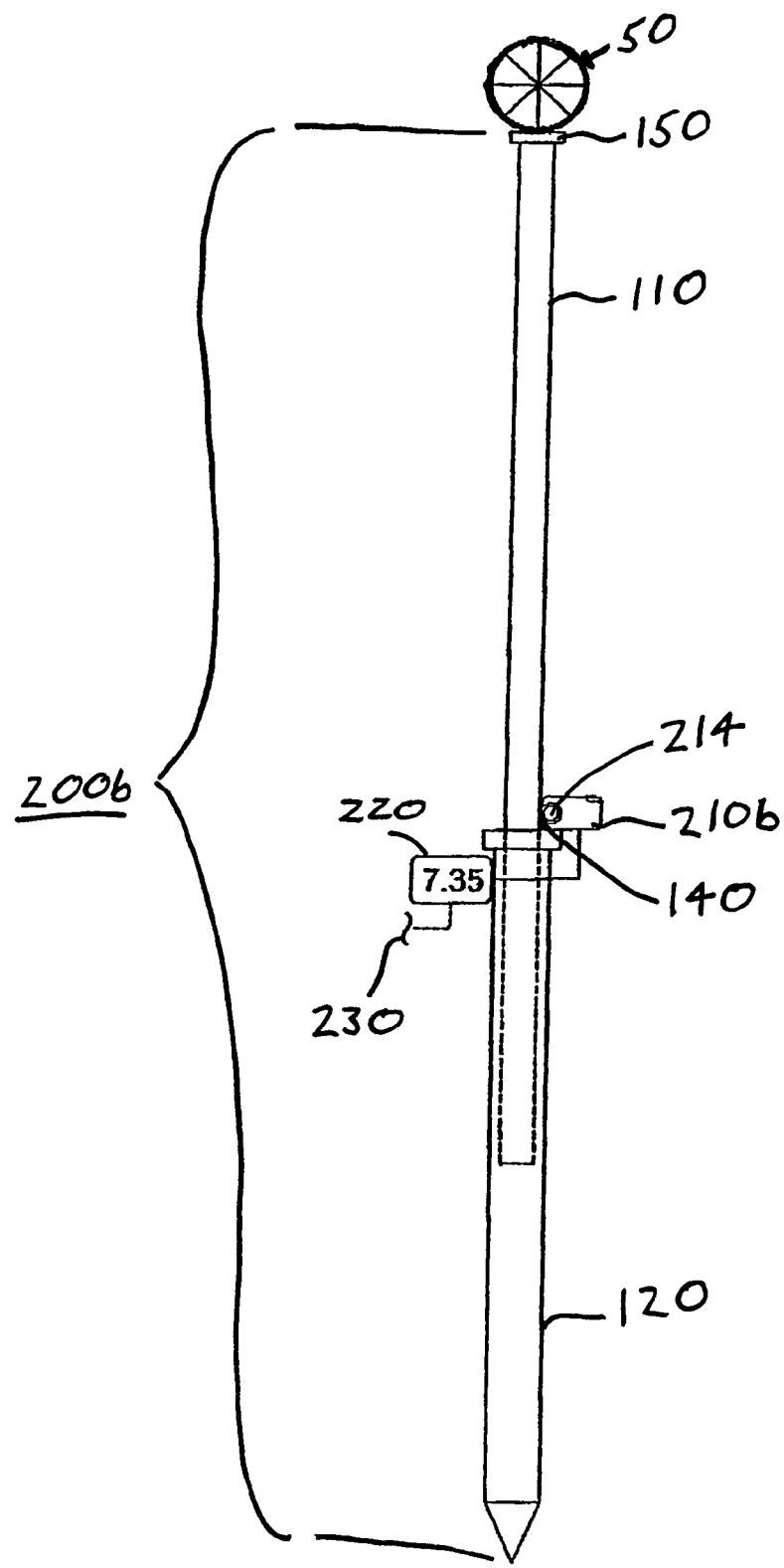
FIG. 2b is a front elevation in accordance with the invention of a reflective prism and a direct reading prism pole having an electronic control unit with a wheel assembly.
Figure 2C:
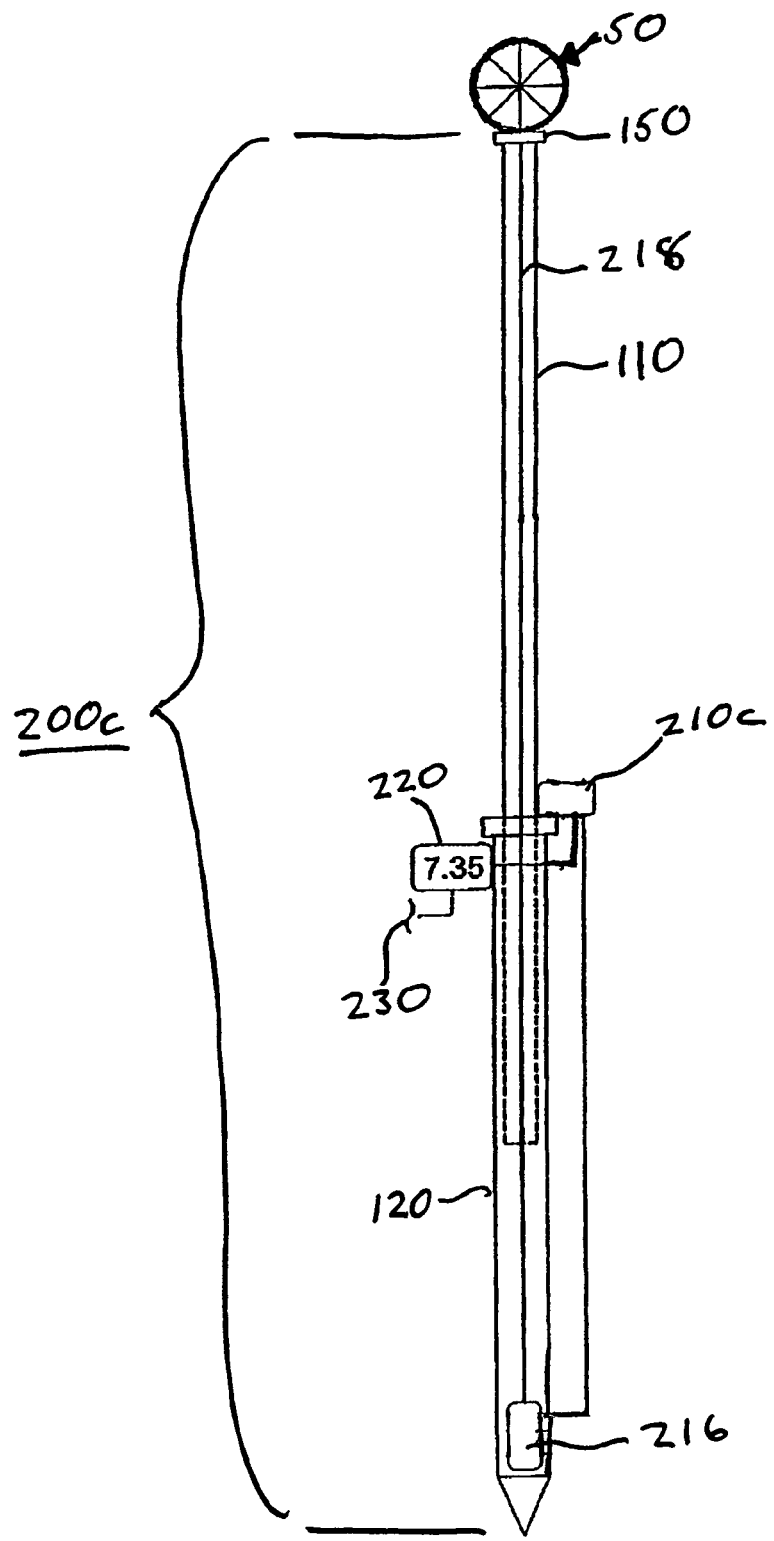
FIG. 2c is a front elevation in accordance with the invention of a reflective prism and a direct reading prism pole having an electronic control unit in combination with a laser sensor.

Referring to FIGS. 2a through 2c, three prism poles embodying the invention are shown. Each one of these three prism poles takes height measurements automatically and displays corresponding height reference data. Furthermore, each one of the three includes an electronic control unit, an electronic display, an output device, and an audio device. For purposes of illustration and without limiting the scope of the invention, each one of the three prism poles are shown and described to include different means for automatically obtaining the height measurements. Each one of the three poles includes height-adjustable rod 110 and tubular housing 120. However, in each one of the three poles, height-adjustable rod 110 and tubular housing may include minor modifications as is necessary and/or desired.

Referring to FIG. 2a, a first direct reading prism pole in accordance with the invention is designated generally 200a. An encoded strip 212 of optically-perceptible markings is positioned longitudinally on height-adjustable rod 110. Direct reading prism pole 200a includes an electronic control unit 210a having an optical reader for reading the optically-perceptible markings of encoded strip 212. Electronic control unit 210a mounts to the flange of tubular housing 120 so the optical reader is positioned near reading point 140.

The optical reader of electronic control unit 210a obtains height measurements by optically reading each optically-perceptible marking at reading point 140 as height-adjustable rod 110 moves with respect to tubular housing 120. Electronic control unit 210a converts one or more height measurements into height reference data. As discussed above, "height reference data" includes (1) data representative of one or more instantaneous height measurements ($h_n$), (2) data representative of one or more changes between height measurements ($\Delta h_{n,n+1}$), and/or (3) other related data. Electronic control unit 210a includes a processor and a memory device.

Each optically-perceptible marking of encoded strip 212 represents height information that is "absolute" in the sense that each optically-perceptible marking is representative of the total distance from the optically-perceptible marking to lip 150. For example, an optically-perceptible marking may be representative of seven (7) feet, six and ninety-nine hundredths (6.99) of a foot, six and ninety-eight hundredths (6.98) of a foot, three and fifty-two hundredths (3.52) of a foot, two hundredths (0.02) of a foot, etc. Each optically-perceptible marking of encoded strip 212 may represent height information that is "incremental" in the sense that each optically-perceptible marking represents a distance to an adjacent optically-perceptible marking. For example, encoded strip 212 could include seven hundred (700) optically-perceptible markings, where each optically-perceptible marking represents one one-hundredth ($1/100$) of a foot, and where electronic control unit 210a calculates a height measurement based on a previous (or default) height measurement and the number of optically-perceptible markings displaced during the movement of height-adjustable rod 110 with respect to tubular housing 120.

Direct reading prism pole 200a also includes an electronic display 220 and an audio device (not shown), each in electrical communication with electronic control unit 210a. Electronic display 220 preferably receives height reference data from electronic control unit 210a and displays the height reference data on a screen in a pre-programmed or user-selected format. Electronic display 220 mounts to the outer surface of tubular housing 120 at any suitable location.

The audio device (not shown) preferably emits an alarm in response to receipt of a signal from electronic control unit 210a indicating motion of height-adjustable rod 110 with respect to tubular housing 120. In this respect, the audio device aids in alerting the operator when a change in height has occurred. The audio device mounts to the outer surface of tubular housing 120 at any suitable location; however, the audio device may be integrated with electronic display 220 as a component thereof. The operator of direct reading prism pole 200a may suppress the alarm by pressing a key on electronic display 220.

Direct reading prism pole 200a also includes an output device shown and designated as 230. Output device 230 is in electrical communication with electronic control unit 210a and preferably includes an output jack or a wireless transmitter for sending height reference data from electronic control unit 210a to a data collection device (not shown). Although an operator of direct reading prism pole 200a may read height reference data directly from electronic display 220 in order to manually enter the height reference data into a log book or data collection device, output device 230 preferably communicates height reference data directly from electronic control unit 210a to a data collection device, such as an electronic field device for storing survey-related information. The data collection device may include a remote computer system adapted to wirelessly receive, store, and analyze height reference data.

Referring to FIG. 2b, a second direct reading prism pole is designated generally 200b. Direct reading prism pole 200b includes an electronic control unit 210b for automatically taking height measurements and providing corresponding height reference data. Electronic control unit 210b includes a wheel assembly 214 having a wheel and a central axis. Electronic control unit 210b mounts to the flange of tubular housing 120 so the wheel is positioned near reading point 140.

The wheel of wheel assembly 214 creates a friction fit with height-adjustable rod 110. The friction fit causes the wheel of wheel assembly 214 to rotate about the central axis when height-adjustable rod 110 moves with respect to tubular housing 120. Because the radius of the wheel is constant, electronic control unit 210b may calculate a height measurement by using a previous (or default) height measurement and a change in height corresponding to an angular displacement of the wheel.

Electronic control unit 210b stores height measurements. Electronic control unit 210b is also programmed with a default initial height measurement associated with a fully extended position of height-adjustable rod 110. For example, if height-adjustable rod 110 is fully extended prior to use and the total distance between reading point 140 and lip 150 is seven (7) feet, then the default initial height measurement would be seven (7) feet. Electronic control unit 210b may also include manually-operable controls for setting or adjusting the default initial height measurement.

Electronic control unit 210b is preferably in electrical communication with electronic display 220, output device 230, and the audio device (not shown) in a manner similar to that described above with respect to electronic control unit 210a. However, for brevity, the disclosure made above with regard to electronic display 220, output device 230, and audio device (not shown) is incorporated by reference.

Referring to FIG. 2c, a third direct reading prism pole is designated generally 200c. Direct reading prism pole 200c includes an electronic control unit 210c in electrical communication with a laser sensor 216 for automatically obtaining height measurements and providing corresponding height reference data. Electronic control unit 210c mounts to any suitable location on direct reading prism 200c. Laser sensor 216 mounts to the outer surface of tubular housing 120 with the laser-emitting side of laser sensor 216 pointing directly toward lip 150. The laser-emitting side of laser sensor 216 is perpendicular to the common longitudinal axis of height-adjustable rod 10 and tubular housing 120.

Laser sensor 216 emits a laser 218 in the direction of lip 150 to measure the distance between lip 150 and laser sensor 216. Laser 218 preferably travels toward lip 150, parallel to height-adjustable rod 110, and perpendicular to lip 150. Laser sensor 218 measures distance between laser sensor 218 and lip 150 by using the velocity of laser 218 and the time it takes laser 218 to travel between laser sensor 216 and lip 150. Electronic control unit 210c is preferably programmed with the default initial distance between laser sensor 216 and lip 150 when height-adjustable rod 110 is in a fully extended position. Electronic control unit 210c preferably calculates a height measurement by using the measured distance from laser sensor 216 to lip 150 and the initial default distance from laser sensor 216 to lip 150.

Electronic control unit 210c is in electrical communication with electronic display 220, output device 230, and the audio device (not shown) in a manner similar to that described above with respect to electronic control unit 210a. For the purpose of brevity, the disclosure made above with regards to electronic display 220, output device 230, and audio device (not shown) is incorporated by reference.

The following is claimed:

1. A direct reading prism pole for automatically taking height measurements and providing corresponding height reference data, comprising:
   a) a tubular housing having an open top, a flange positioned at the open top, and a conical bottom portion for wedging the tubular housing into ground soil;
   b) a height-adjustable rod partially inserted into the tubular housing and having an outer diameter just less than an inner diameter of the tubular housing to create a friction fit therebetween for positioning the height-adjustable rod with respect to the tubular housing;
   c) an encoded strip of optically-perceptible markings positioned longitudinally on the height-adjustable rod;
   d) an electronic control unit having an optical reader, the electronic control unit being mounted on the flange at a reading point to obtain height measurements from the encoded strip, and the electronic control unit processing the height measurements into height reference data;
   e) an electronic display in electrical communication with the electronic control unit for receiving the height reference data and displaying the height reference data on a screen;
   f) an audio device in electrical communication with the electronic control unit for emitting an alarm in response to receipt of a signal from the electronic control unit indicating movement of the height-adjustable rod with respect to the tubular housing; and
   g) an output device in electrical communication with the electronic control unit for sending the height reference data to a data collection device.

2. A direct reading prism pole for automatically taking height measurements and providing corresponding height reference data, comprising:
   a) a tubular housing having an open top, a flange positioned at the open top, and a conical bottom portion for wedging the tubular housing into ground soil;
   b) a height-adjustable rod partially inserted into the tubular housing and having an outer diameter just less than an inner diameter of the tubular housing to create a friction fit therebetween for positioning the height-adjustable rod with respect to the tubular housing;
   c) an electronic control unit including a wheel assembly having a wheel and a central axis, the wheel forming a friction fit with the height-adjustable rod and rotating about the central axis in response to motion of the height-adjustable rod with respect to the tubular housing, and the electronic control unit calculating a height measurement from an angular displacement of the wheel and converting the height measurement into height reference data;
   d) an electronic display in electrical communication with the electronic control unit for receiving the height reference data and displaying the height reference data on a screen;
   e) an audio device in electrical communication with the electronic control unit for emitting an alarm in response to receipt of a signal from the electronic control unit indicating movement of the height-adjustable rod with respect to the tubular housing; and
   f) an output device in electrical communication with the electronic control unit for sending the height reference data to a data collection device.

3. A direct reading prism pole for automatically taking height measurements and providing corresponding height reference data, comprising:
   a) a tubular housing having an open top, a flange positioned at the open top, and a conical bottom portion for wedging the tubular housing into ground soil;
   b) a height-adjustable rod partially inserted into the tubular housing and having an outer diameter just less than an inner diameter of the tubular housing to create a friction fit therebetween for positioning the height-adjustable rod with respect to the tubular housing;
   c) a lip positioned at the top of height-adjustable rod;
   d) a laser sensor mounted to the outer surface of the tubular housing for emitting a laser toward the lip to take height measurements of the distance between the laser sensor and the lip, the laser being parallel to the height-adjustable rod and perpendicular to the lip;

e) an electronic control unit in electrical communication with the laser sensor for receiving the height measurements and providing height reference data corresponding to the height measurements;

f) an electronic display in electrical communication with the electronic control unit for receiving the height reference data and displaying the height reference data on a screen;

g) an audio device in electrical communication with the electronic control unit for emitting an alarm in response to receipt of a signal from the electronic control unit indicating movement of the height-adjustable rod with respect to the tubular housing; and h) an output device in electrical communication with the electronic control unit for sending the height reference data to a data collection device.

* * * * *